Jan. 5, 1937.  R. F. PEO  2,066,695
JOINT
Filed July 23, 1934
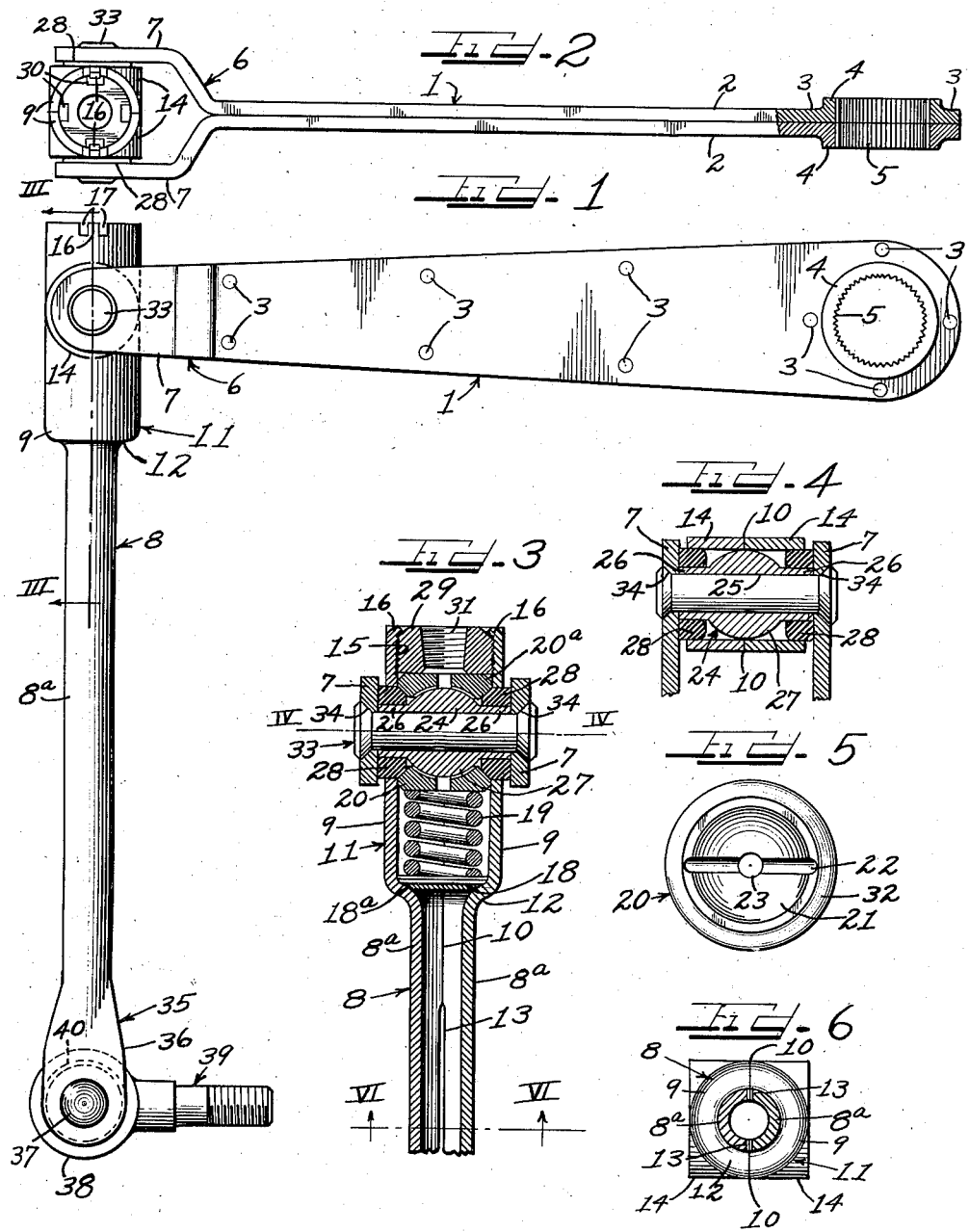
Inventor
Ralph F. Peo.

Patented Jan. 5, 1937

2,066,695

UNITED STATES PATENT OFFICE 2,066,695

JOINT

Ralph F. Peo, Buffalo, N. Y., assignor to Houde Engineering Corporation, Buffalo, N. Y., a corporation of New York Application July 23, 1934, Serial No. 736,493

4 Claims. (287—90)

This invention has to do with joints and is concerned more particularly with oscillatory joints for use in connection with shock absorbers and the like.

It is an object of the invention to provide an improved connection between an oscillating shaft such as the rock shaft of a shock absorber and a connecting rod adapted to be connected to a movable device such as an axle or automobile wheel supporting member, so as to occupy a minimum of space transversely.

It is another object of the invention to provide an improved joint between the rock shaft lever and the connecting rod by means of which the use of a lever of substantially lighter construction than has heretofore been feasible is made possible.

A further object of the invention resides in the provision of a joint of this character embodying a ball member constructed and arranged to be connected on opposite sides thereof to the oscillating shaft lever.

Another object of the invention resides in the provision of a combination forked joint between the connecting rod and rock shaft lever embodying both metallic and relatively soft non-metallic means for affording the desired universal movement between the rod and the lever.

In accordance with the general features of the invention, there is provided a preferably tubular drag link or connecting rod member formed of generally semi-cylindrical parts providing a housing. The joint mechanism comprises a ball member resiliently trunnioned in the housing, diametrically opposed bearing members engaging the ball member, means resiliently pressing the members together, and an adjusting means for varying the spring pressure. The rock shaft lever is formed as a fork at one end providing arms between which is mounted the ball member. The parts are arranged to compress the resilient means, which serves as an anti-rattling means and as a seal between the ball member and the housing.

The lever is formed of sheet metal straps suitably united in laminated form and oppositely bossed at the end opposite the fork and provided with serrations extending throughout the combined length of the bossed portions for connection to the rock shaft of a shock absorber such as a double-acting shock absorber.

Further objects and advantages of the invention will appear as the description proceeds.

The invention (in a preferred form) is illustrated in the drawing and hereinafter more fully described.

On the drawing:

Figure 1 is an elevational view of an assembly embodying the invention.

Figure 2 is a plan view of the upper part of Figure 1, certain parts being shown in section.

Figure 3 is an enlarged fragmentary sectional view taken substantially in the plane designated by the line III—III in Figure 1, the pivot element being shown for convenience in elevation.

Figure 4 is a fragmentary sectional view taken substantially in the plane designated by the line IV—IV in Figure 3.

Figure 5 is an enlarged plan view of the lower bearing seat shown in Figure 3.

Figure 6 is a sectional view of the drag link, taken substantially in the plane designated by the line VI—VI in Figure 3.

As shown on the drawing:

Referring now more particularly to the drawing, the lever 1, provided to establish a connection between the rock shaft of a double-acting shock absorber (not shown) and a connecting rod or drag link, is preferably formed of sheet metal comprising substantially identical elongated pieces 2 which are united throughout preferably the major portions of their lengths as by spot welding 3. If desired, however, the pieces 2 may be united by bolts, rivets or any other suitable means. The pieces 2 are preferably wider at one end than at the other and, at the wider end, each is provided with a preferably cylindrical boss 4. When the pieces 2 are assembled as described above, the bosses 4 are coaxially aligned and extend away from each other. A circular series of longitudinal serrations 5 is formed in the generally cylindrical hub formed by the bosses of the pieces 2, the length of the serrations being thus substantially greater than the thickness of the sheet metal so as to enable the serrations to properly transmit stresses to the rock shaft (not shown) from the lever 1.

At their opposite and narrower ends, the pieces 2 are bent apart and bent again in substantial parallelism to provide a fork 6 having generally parallel arms or prongs 7. This fork structure forms an essential part of the forked joint about to be described.

The link 8 is preferably hollow for the purpose of lightness without sacrificing strength. It may be formed in various ways but preferably comprises a pair of generally semi-cylindrical elongated elements 8a, each having an end portion of increased diameter as shown at 9. The elements 8a are substantially identical and formed to be mated at their edges as shown by the lines 10, where they are welded together to provide a tubular structure having an enlarged end portion 11 providing a shoulder 12. Portions of the elements 8a along the edges thereof are preferably cut away as at 13, affording longitudinal spaces between welded edge portions of the elements 8a.

Each element 8a in its enlarged portion 9 is formed with a transversely arranged cylindrical portion symmetrical with and at right angles to the axis of the element. The shape of the portion 9 at this point will be understood as that of a hollow semi-cylinder joined to a right angularly related cylinder, with the free circular edge of the latter terminating flush with an element on the outer surface of the semi-cylindrical portion. When the elements 8a are joined as described above or in any other suitable manner as by bolts, rivets or the like, the said cylindrical portions, which are in effect bosses, are preferably arranged coaxially as at 14 in Figures 2 and 4.

The enlarged portion or housing 11 of the link 8 is interiorly threaded at its free end as shown at 15, and tongues 16 are formed at the ends of the respective portions 9, between the kerfs 17. The tongues 16 when formed do not project into the interior of the enlargement 11, but are forced inward only for the purpose of holding the parts in properly assembled relation as will appear hereinafter.

The parts of the joint mechanism not heretofore described are referred to as follows in connection with the manner of assembling the same.

A plate or disc 18 is positioned in the housing 11 so as to engage the shoulder 12, and thereafter a spring 19 is positioned in the housing so as to abut the disc 18. A bearing disc 20 is positioned in the housing so as to form the opposite abutment for the spring 19 and for that purpose may be provided with a flat face on one side. The bearing member 20 is formed on its opposite side with a part-spherical surface 21 provided with a transverse groove 22 and a central hole 23 communicating therewith so as to afford access of grease or other lubricant to the part-spherical surface. The bearing member 20 is preferably circular as is also the housing 11 and is dimensioned to fit slidably within the housing so as to cooperate therewith telescopically.

For cooperation with the bearing member 20 and another like bearing member, there is provided a ball piece 24 in the form of a sleeve having a cylindrical bore 25 and provided with end portions in the form of trunnions 26 and an intermediate spherical portion 27 of substantially the same curvature as the part-spherical surface 21 on the bearing member 20. Rubber, leather or the like flexible grommets or rings 28 are fitted preferably tightly about the trunnions 26 and are normally of a diameter to fit in the cylindrical portions 14. The diameter of the ball portion 27 is such as to enable the same readily to pass through either of the cylindrical portions 14 into the interior of the housing 11. When this is done, it is necessary to press the bearing member 20 and consequently the spring 19 toward the disc 18, the spring 19 readily permitting such pressure. The grommets 28, when fitted in the cylindrical portions 14 and about the sleeve trunnions 26, serve by virtue of their cooperation with the housing 11 to hold the disc 18, spring 19, bearing member 20 and ball member 24 in proper cooperative and assembled relation as shown in Figure 3. Viewing Figure 3, it will be understood that with the parts thus far assembled, the rings 28 will be disposed slightly outward of the positions shown in that figure, since said rings are normally preferably flat on both sides.

A second and substantially identical bearing member 20a is located adjacent the threaded end of the housing 11 so that its part spherical surface engages the spherical portion of the ball piece 24 opposite the bearing member 20. A plug 29 is threaded into the housing 11 and against the bearing member 20a so as to hold the latter in proper engagement with the ball piece 24, leaving the latter, however, in substantially coaxial relation to the cylindrical portions 14. The plug 29 is provided with slots or kerfs 30 which, when the plug 29 is threaded home, are arranged to receive the tongues 16, which are thereupon bent into two of the kerfs 30 as shown in Figures 1, 2 and 3. Four equally spaced kerfs 30 are shown on the member 29, to provide for close adjustment. It will be appreciated that any desired number of such kerfs may be provided to obtain the desired degree of adjustment of the plug 29. After the tongues 16 are bent into position as shown in Figures 1, 2 and 3, the plug 29 is locked against turning and accordingly cannot be withdrawn.

The plug 29 is tapped at 31 for the reception of a suitable lubricating fitting.

With the parts thus assembled, the fork arms 7 are arranged so as to straddle the housing 11. In order to place the arms 7 against the ends of the ball piece 24, it is necessary for said arms 7 to compress the sleeves 28. The bearing members 20 and 20a adjacent their part-spherical surfaces are substantially frusto-conical as shown at 32. These frusto-conical surfaces engage the inner margins of the flexible rings 28 and cause the portions of the flexible rings engaged thereby to be tapered as shown in Figure 3. The rings, being compressed on the one hand between the fork arms 7 and bearing members 20 and 20a, and on the other hand between the trunnions 26 and the cylindrical portions 14, form yieldable connections between the respective parts and at the same time prevent escape of lubricant and entry of dust and other foreign matter. The rings 28 are preferably formed of a material which is not deteriorated by oil, grease and the like.

With the fork arms 7 pressed against the ends of the trunnions 26 and the rings 28, a connecting element, which is herein illustrated in the form of a rivet or like member 33, is passed through registering openings 34 in the fork arms 7 and through the ball piece 24, and the ends of said member 33 are headed to provide a unitary end assembly. The openings 34 are countersunk and the ends of the element 33 are headed so as to fit in the countersunk portions, thereby permanently securing the arms 7 in assembled relation to the other parts. Relative surface movement between the parts thus takes place at the bearing surfaces between the seat members 20 and 20a and the ball portion 24. The length of the ball piece 24 is preferably slightly greater than the diameter of the housing 11 so as to cause the arms 7 when properly assembled therewith to be spaced slightly from the housing 11, to permit relative movement between the housing 11 and the fork arms 7, and consequently between the link 8 and the lever 1, in different planes.

The other end 35 of the link 8 may be formed in any suitable manner as by flattening the corresponding ends of the parts 8a to provide a fork having arms 36 pivoted at 37 to an eye 38 of an eye bolt 39 by means of a snug fitting rubber sleeve 40 fitted between the arms 36 and the eye 38 and between the pivot element 37 and the eye 38. Any other suitable connection at the end 35 of the link 8 may be provided, and while the eye bolt 39 is shown as extending in substantially the same plane as that of the link 8 and lever 1, and in the same direction as the lever 1 relative to the link 8, it could be arranged to extend in any other direction relative to the link 8 and lever 1. Likewise, any other suitable connection may be provided between the eye bolt 39 and the link 8, for connection of the link 8 to a movable device such as an axle or automobile wheel supporting member.

The bearing members 20 may be of any suitable material such as phosphor bronze. The rings 28 are preferably resilient and are preferably formed of rubber or of a composition whose major ingredient is rubber, or of leather or leather composition.

It will be observed that the joint between the link 8 and lever 1 is rather compact and takes up a minimum of space transversely. This is highly desirable especially in connection with automobiles of recent design which, due to the widening of the frame in order to afford a wider spring support at the rear end and to avoid tilting of the car on rounding corners and the like, entails a substantial reduction in the clearance heretofore existing between the frame and the brake housing. The joint structure afforded by the present invention not only is capable of employment notwithstanding this reduced clearance, but is of such a character as to permit the use of a rock shaft lever of substantially lighter construction because of the forked connection rather than the cantilever type of drag link connection.

When the mechanism forming the joint between the link 8 and lever 1 is assembled, the same constitutes a unit which is complete in itself, permanent, affords proper articulation between the connected members, and requires attention only for the addition of lubricant.

The built up sheet metal lever construction may be manufactured at less cost than forged, cast or other levers and yet provides a hub of sufficient length to transmit stresses from the drag link to the rock shaft, and is of sufficient strength to enable the same to withstand stresses tending to bend the lever transversely of itself about the rock shaft.

In order to insure against leakage of oil from the housing into the reduced part of the link, a gasket 18a of paper, rubber or other suitable material is arranged under the disc 18 so as to be compressed between said disc and the shoulder 12.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a joint, a housing having intersecting cylindrical walls providing an axial and a transverse bore, a bearing assembly within said bores including a member having ends extending freely through the transverse bore, resilient grommets surrounding said extended ends and in complete annular contact with the wall of said transverse bore, and a member having a bifurcated end connected to said extended ends and in contact with said grommets to confine said grommets in place to seal said transverse bore while permitting relative angular movement between said housing and said connected member.

2. In a joint including a pair of articulated members having relative pivotal and angular movement, one of said members having an end housing formed with intersecting cylindrical walls forming an axial and a transverse bore, the other of said members having a forked end to receive said housing, a bearing assembly in said bores with cylindrical ends extending freely through said transverse bore and connected to said forked end, and resilient grommets surrounding said extended ends and in contact therewith and with the inner surfaces of said forked ends and with fully cylindrical wall portions of said transverse bore to seal said bore and permit relative angular movement between said articulated members by deformation of said grommets.

3. In a joint including a pair of articulated members having relative pivotal and angular movement, one of said members having an end housing formed with intersecting cylindrical walls forming an axial and a transverse bore, the other of said members having a forked end to receive said housing, a segmental spherical bearing member having trunnions extending freely through said transverse bore and conected to said forked end, bearing seats in said axial bore, means constantly urging said seats into bearing engagement with said spherical bearing member, and resilient grommets surrounding said extended ends and in contact therewith and with the inner surfaces of said forked ends and with fully cylindrical wall portions of said transverse bore to seal said bore and permit relative angular movement between said articulated members by deformation of said grommets.

4. In a joint, a member having an end housing, a second member having a forked end for receiving said housing, said housing having a transverse cylindrical bore, a bearing assembly in said housing including a segmental spherical member having trunnions extending freely through said bore and connected to said forked end, and resilient annular grommets surrounding said trunnions and in full cylindrical surface contact with the wall of said bore and in surface contact with said forked ends and held under compression thereby to seal said bore during relative angular movement of said members.

RALPH F. PEO.